United States Patent
Löschmann

(10) Patent No.: US 7,000,608 B2
(45) Date of Patent: Feb. 21, 2006

(54) SOLAR ENERGY SYSTEM

(76) Inventor: Thomas Löschmann, Maybachstrasse 4, Eppelheim 66214 (DE)

( * ) Notice: Subject to any disclaimer, the term of this patent is extended or adjusted under 35 U.S.C. 154(b) by 0 days.

(21) Appl. No.: 10/493,371

(22) PCT Filed: Oct. 23, 2002

(86) PCT No.: PCT/EP02/11851

§ 371 (c)(1), (2), (4) Date: Apr. 23, 2004

(87) PCT Pub. No.: WO03/038349

PCT Pub. Date: May 8, 2003

(65) Prior Publication Data
US 2004/0245782 A1 Dec. 9, 2004

(30) Foreign Application Priority Data

Oct. 30, 2001 (DE) ................................ 101 54 909
Dec. 12, 2001 (DE) ................................ 101 62 116

(51) Int. Cl.
F24J 2/38 (2006.01)

(52) U.S. Cl. ....................................... 126/571; 290/1 R

(58) Field of Classification Search ................ 290/1 R; 126/571, 569, 570, 572, 573
See application file for complete search history.

(56) References Cited

U.S. PATENT DOCUMENTS

| | | | | |
|---|---|---|---|---|
| 1,111,239 A | * | 9/1914 | Smelser | 359/853 |
| 3,466,119 A | * | 9/1969 | Giovanni | 359/851 |
| 4,056,313 A | * | 11/1977 | Arbogast | 353/3 |
| 4,345,582 A | * | 8/1982 | Aharon | 126/574 |
| 4,425,423 A | * | 1/1984 | Wang | 430/264 |
| 4,425,904 A | * | 1/1984 | Butler | 126/606 |
| 4,466,423 A | * | 8/1984 | Dolan et al. | 126/571 |
| 4,559,926 A | * | 12/1985 | Butler | 126/578 |
| 2003/0136397 A1 | * | 7/2003 | Kinoshita | 126/600 |

FOREIGN PATENT DOCUMENTS

| | | | |
|---|---|---|---|
| DE | 29511523 U1 | * | 11/1995 |
| DE | 19525994 A1 | * | 1/1997 |
| DE | 19718358 A1 | * | 11/1998 |
| DE | 200 21 890 U1 | | 4/2001 |
| DE | 10247177 A1 | * | 4/2004 |
| WO | WO 0192790 A1 | * | 12/2001 |

OTHER PUBLICATIONS

Abstract of WO 01/92790 which corresponds to DE 200 21 890 U1.
International Search Report.

* cited by examiner

Primary Examiner—Joseph Waks
(74) Attorney, Agent, or Firm—Norris McLaughlin & Marcus PA

(57) ABSTRACT

A solar plant with at least two solar units (10xx) where each of the solar units (10xx) comprises a securing device (12) and a swivel-located supporting structure (14) mounted on it, on which solar modules and/or solar collectors (16) can be mounted, and which can follow the course of the sun by way of its rotational axis arranged essentially in a vertical position to the earth's surface. It is envisaged that the supporting structure (14) of at least one of the solar units (10xx) is connected with at least one further supporting structure (14) of a solar unit (10xx) by way of at least one mechanical transmission device (32) for the transmission of an actuation movement.

15 Claims, 7 Drawing Sheets

SOLAR ENERGY SYSTEM

Figure 1:
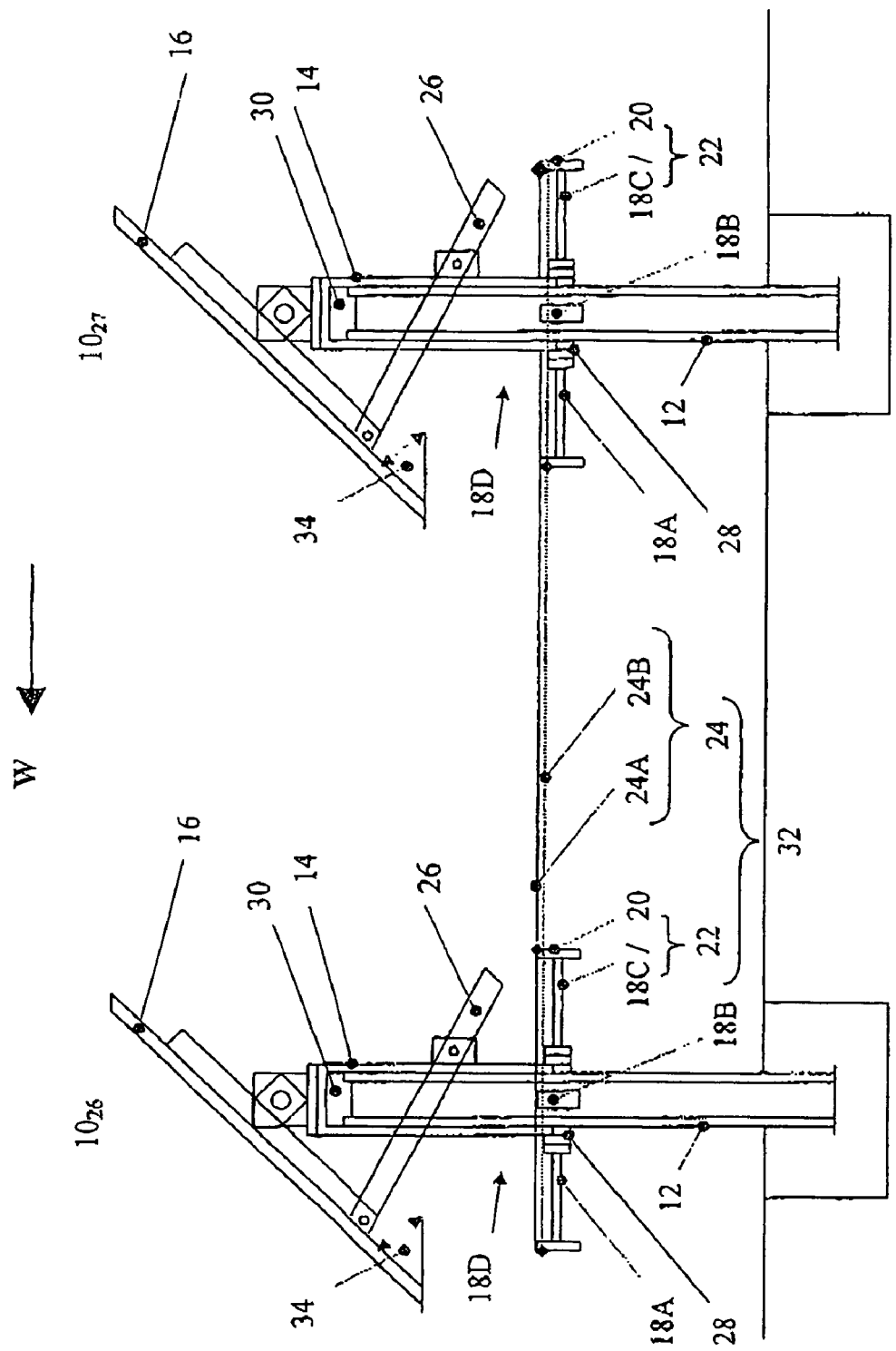

The invention concerns a solar plant with at least two solar units.

In addition to stationary installed solar plants, systems are known in solar technology by means of which photovoltaic modules, described in the abbreviated form as solar modules, or solar collectors follow the sun with a single or two-axis movement.

Solar modules consist of a large number of solar cells assembled to form a module and serve the purpose of direct production of electric energy from solar energy.

Solar collectors, of which the flat collectors are most commonly used, are applied as a device for transforming solar energy into heat.

A solar plant for producing electric energy consists of a solidly mounted photovoltaic generator, a string inverter and a network input. The solar generator supplies electric current when the sun shines on it. This current is then fed into the existing power network by way of the inverter. The daily output of a stationary installed plant is made up of the global radiation before noon and after noon and during midday from the direct radiation, where the incoming radiation power constantly changes with the angle of incidence of the sun to the solar module. Measurements taken over a longer period have shown that the energy yield with stationary installed solar modules corresponds to five times the installed generator power. The factor 5 applies for a 15-hour sun radiation input in the summer months.

In order to obtain an energy additional yield compared with a stationary installed solar plant, two-axis follow-up solar plants are usually applied in practice. Such a solar plant is described in the DE-GBM 297 07 201. By means of a cylindrical turning device following the sun's position, the solar modules follow up the course of the sun around, essentially, a rotational axis arranged vertically to the earth's surface. In addition to the vertical adjustment, a follow-up of the solar modules in two-axis solar plants is possible with reference to a horizontal axis. With this, the solar modules of the solar plant are aligned at an angle of 90° to the sun. The daily output of this solar plant is made up of the global radiation at sunrise approx. 30 minutes (time for the return) and of the direct input radiation of the sun for the rest of the day. Practice shows that the energy yield corresponds to 12-times the installed generator power. This factor 12 also applies for a 15-hour sun input radiation in the summer months. For performing the turning movement, only a daily energy consumption of the actuator of this plant of 3 to 6 Wh is to be calculated for a solar plant as described with, for example, 50 solar modules each having 85 Wp=4,250 Wp.

Verification measurements and yield calculations show that the yield of a follow-up two-axis solar plant increases by approx. 30%.

However, the disadvantages of follow-up plants to the sun's position lie in the fact that they are relatively expensive because they must be equipped with a control unit for follow-up of the solar modules as well as with motors and gears. The increased energy yield and the correlated financial advantage is, however, eliminated by the increased extra costs of the plant. Therefore, follow-up solar plants up to the present could hardly achieve market shares in the expanding solar market.

For higher capacities to be installed, an installation of several solar units to a solar plant is necessary where each of the solar plants is equipped with the necessary equipment for the sun position follow-up. High investment and maintenance costs are the subsequent result.

The task assignment of the invention is to create a follow-up device for a solar plant which is inexpensive, technically uncomplicated to realise and requires low level maintenance.

This task assignment is solved by a solar plant described herein.

Due to the fact that several solar units can be mechanically coupled to a solar plant in such a way that an actuation movement, caused by an actuating device, of only one of the solar units leads to a follow-up of all coupled solar units, the multiple required gears, motors and control units are advantageously relinquished which are needed separately for each solar unit involving an uncoupled single arrangement. The specific investment costs are reduced.

According to the invention, the coupling and transmission of the actuating movement is effected by at least one mechanical transmission device by means of supporting frames attached to the supporting structures of the solar units.

A solar plant which can, for example, consist of 50 solar units with their relevant supporting structures, each having 8 m² solar modules and/or solar collectors, therefore for example a total of 400 m² solar module or solar collector surface, requires only one motor, a gear and a control device with control unit because of the possible coupling and transmission of the actuation movement produced by the mechanical transmission device.

It is furthermore advantageous that, due to the reduction of the necessary technical equipment to the coupled individual solar units, it is substantially easier to execute the solar units. As a result, a considerable cost reduction is also achieved in this way. On the whole, the significantly lower investment costs of this mechanically coupled follow-up solar plants, for example where photovoltaic plants are concerned, lead to lower cost prices for solar power.

The profitability of the solar plant is significantly increased by the fact that, in addition, the specific maintenance expenditure is substantially reduced in the process.

Moreover, already installed plants with this system can be extended at random by the simple coupling of further solar units.

Advantageous embodiments of the invention result from the features as described herein.

Figure 2:
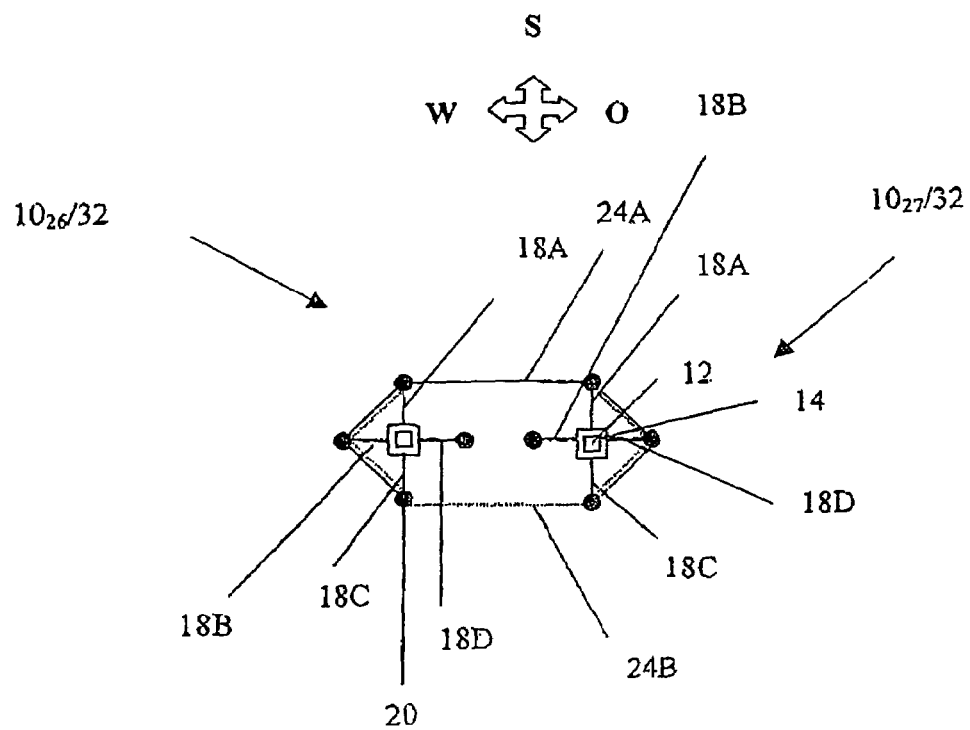
Figure 3:
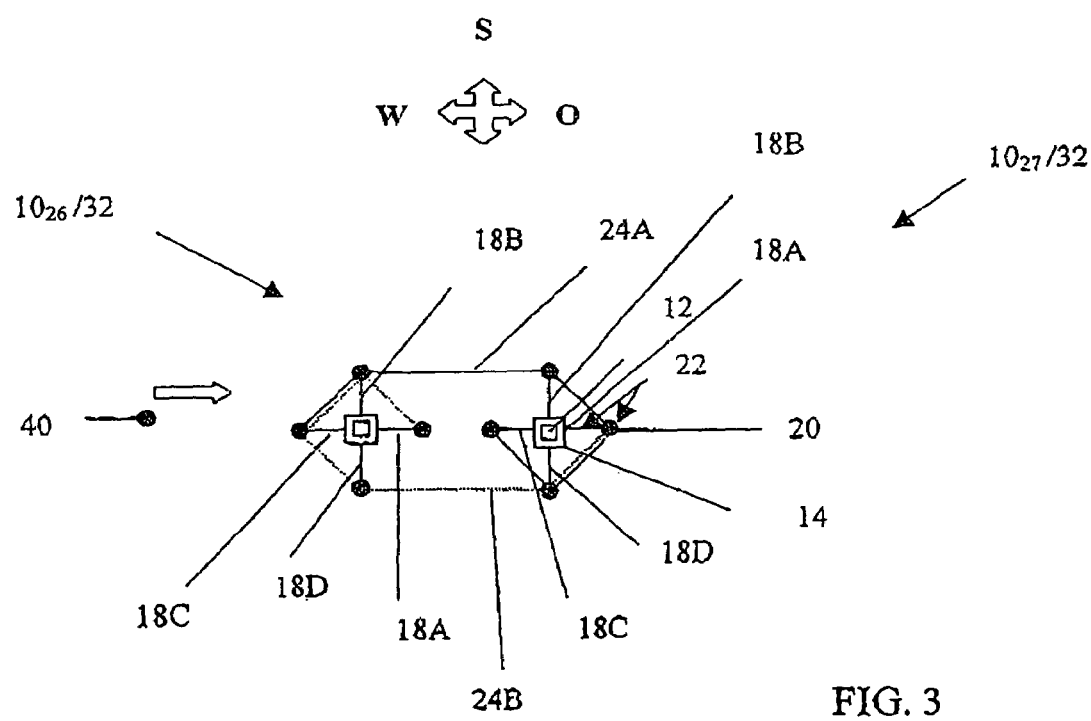
Figure 4:
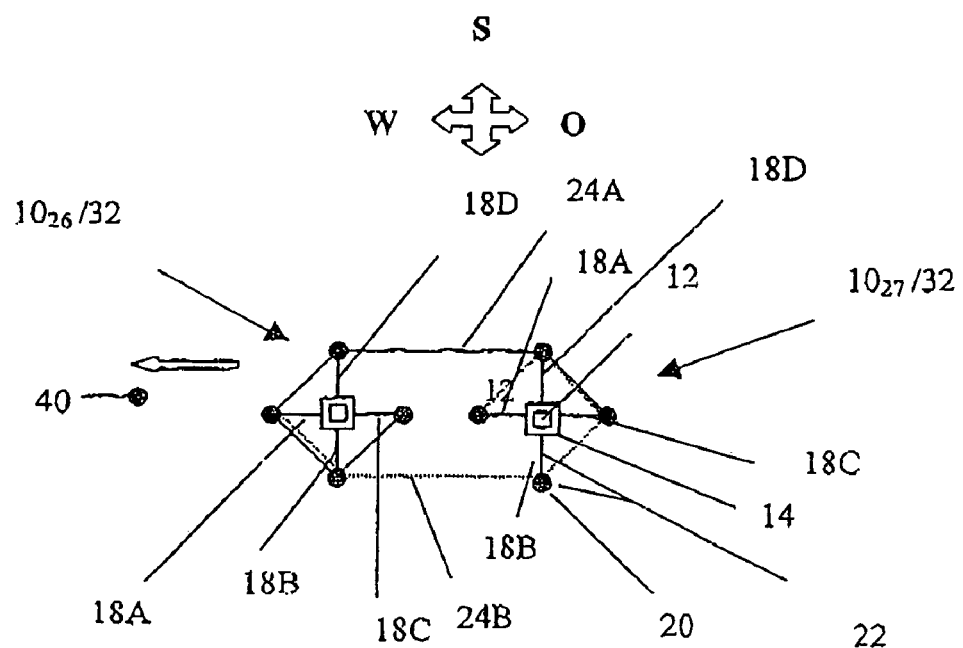
Figure 5:
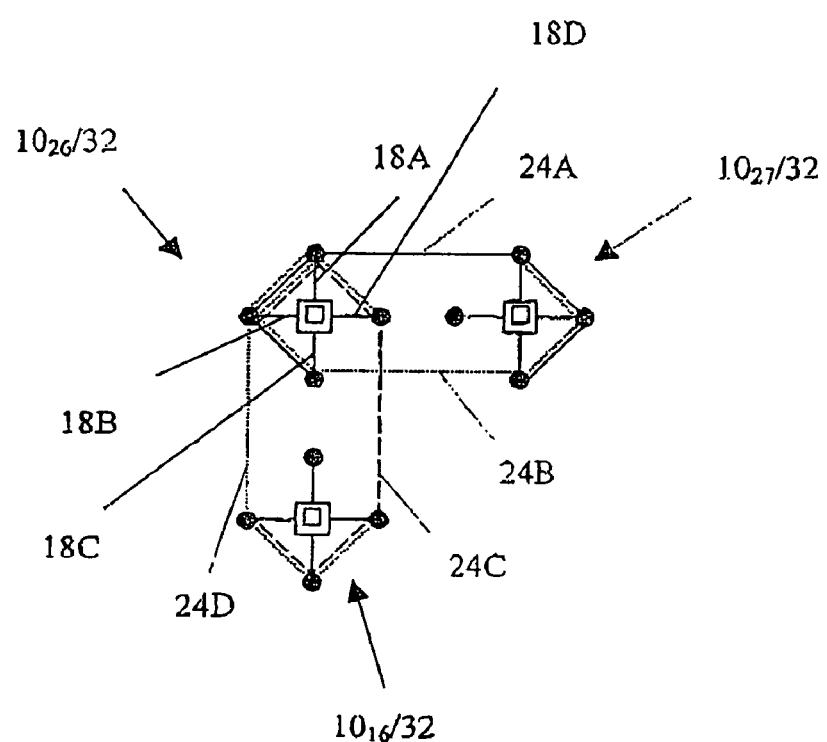
Figure 6:
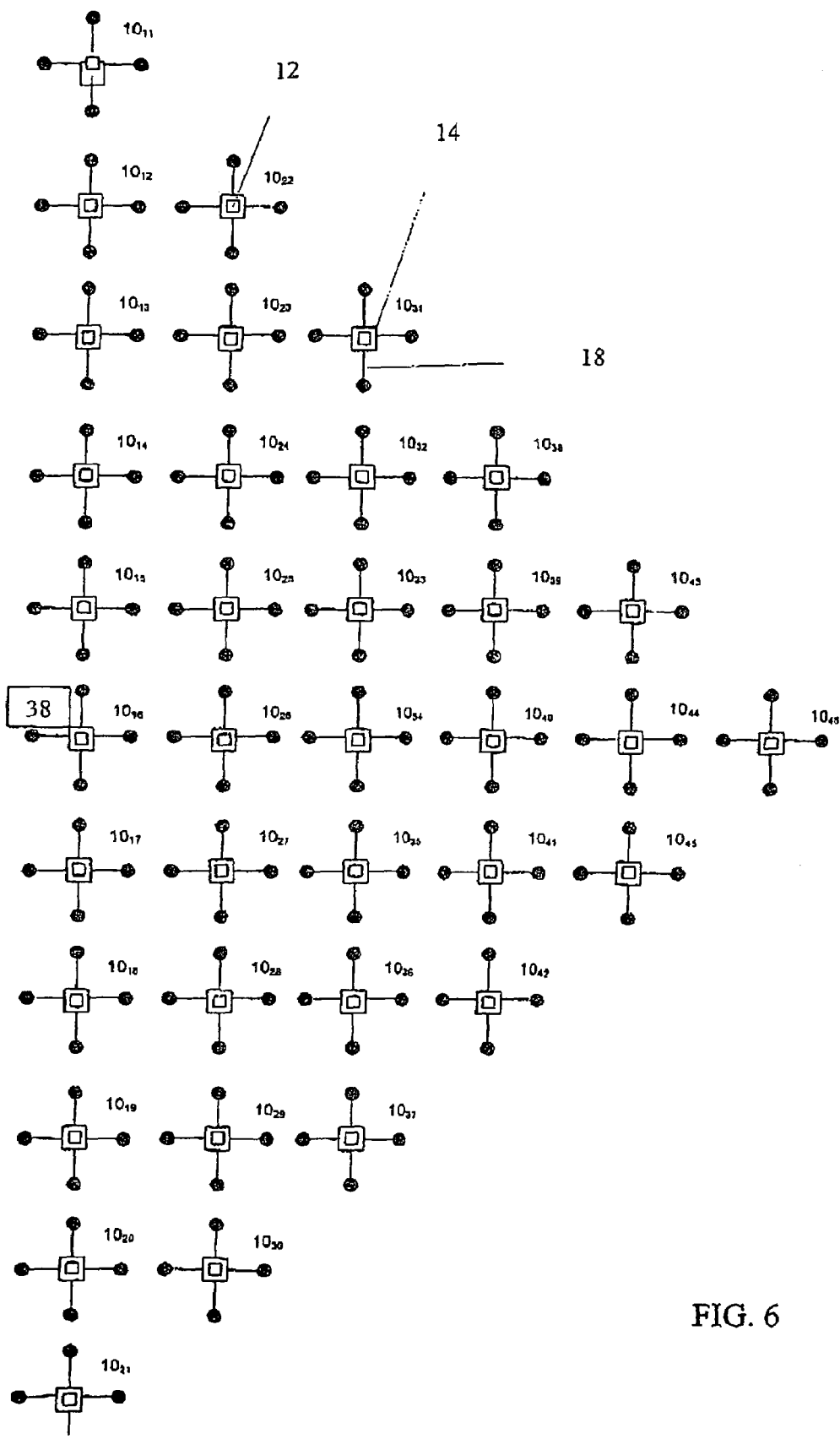
Figure 7:
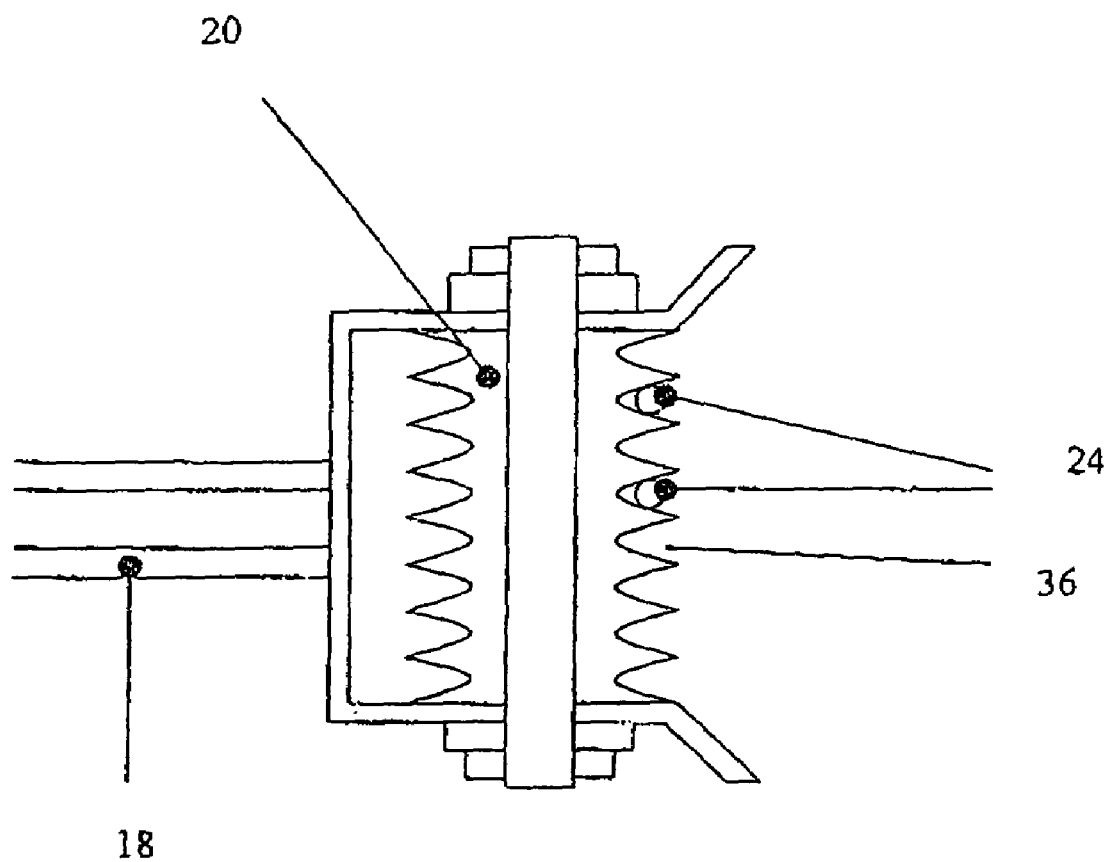
Figure 8:
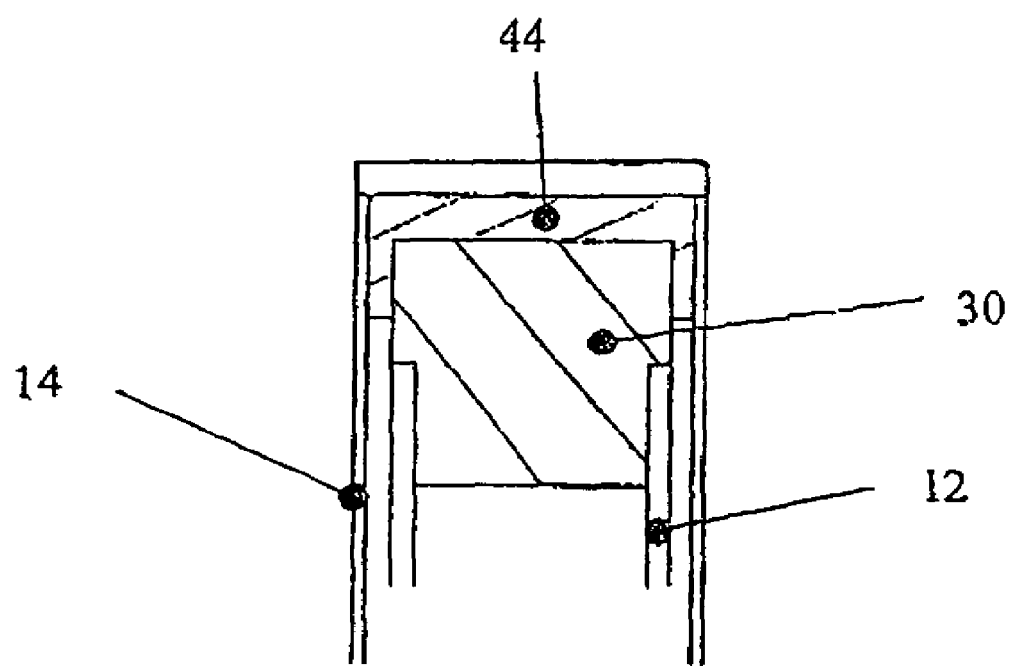

The invention is explained as follows in greater detail in an embodiment example based on the relevant drawings. The drawings show the following:

FIG. 1: a schematic illustration of a solar plant consisting of two solar units in a westerly orientation;

FIG. 2: a schematic illustration (plan view) of a transmission device of two solar units in a basic starting position, for example southerly orientation;

FIG. 3: a schematic illustration (plan view) of the transmission device of two solar units after turning from the southerly to the easterly direction;

FIG. 4: a schematic illustration (plan view) of a transmission device of two solar units after turning from the southerly to the westerly direction;

FIG. 5: a schematic illustration (plan view) of two transmission devices, arranged horizontally to one another, of two solar units and a transmission device of a further solar unit arranged vertically to it;

FIG. 6: a schematic illustration (plan view) of a possible mounting form of a solar plant;

FIG. 7: a schematic illustration of a guide element;

FIG. 8: a schematic illustration of an adjusting and bearing element and

Figure 9:
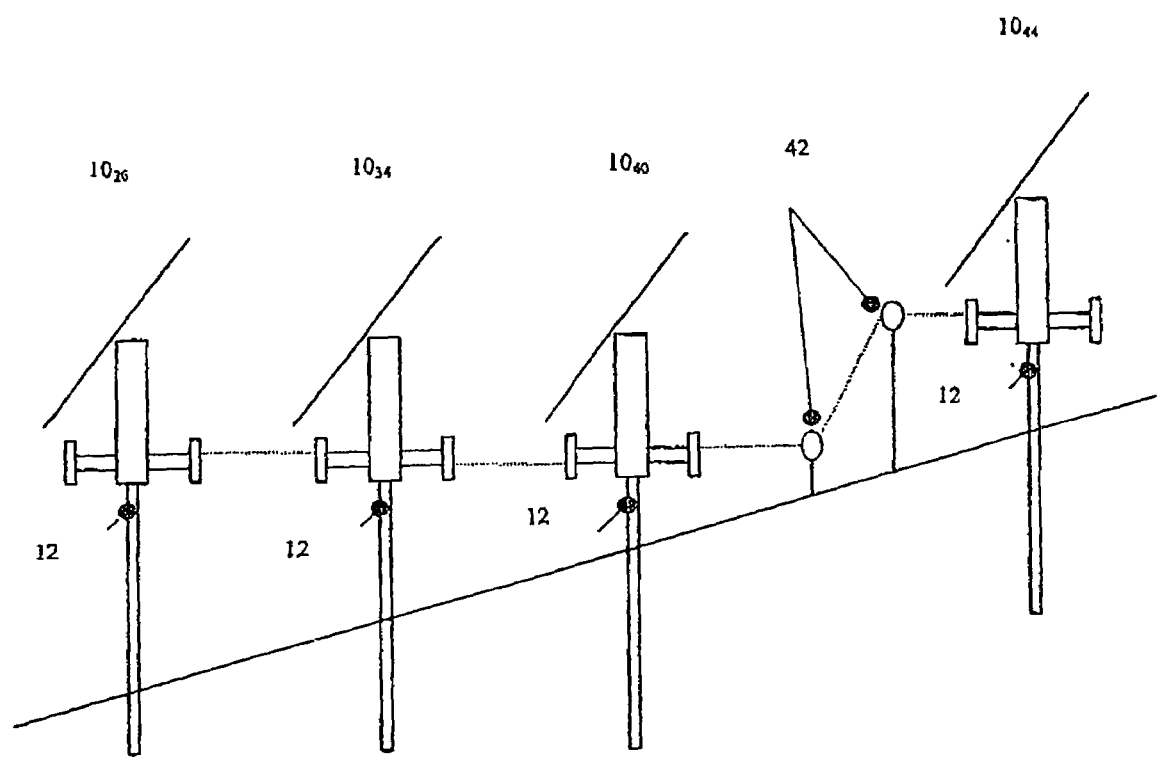

FIG. 9: a schematic illustration of a height adjustment of the solar plant.

FIG. 1 shows a coupled solar plant consisting of the solar units $10_{26}$ and $10_{27}$. In FIG. 1 the solar plant is aligned in the westerly direction. The solar units $10_{26}$ and $10_{27}$ are identical with regard to their assembly structure so that the following description is based on the solar unit $10_{26}$. The solar unit $10_{26}$ consists of a securing device 12 by means of which the solar unit $10_{26}$ is secured onto a solid subsurface. In this case, the securing device 12 for example is cemented into a concrete foundation or, for example, can be directly attached to a corresponding substructure. A supporting structure 14 is rotatably bearing-mounted on the securing device 12. The swivel-movable bearing-located supporting structure 14 is mounted in a low friction manner at the securing device 12 by means of a journal bearing 28 where this journal bearing, at the same time, serves the purpose of vertical alignment of the supporting structure 14. An adjusting and bearing element 30, mounted on the head end of the securing device 12, carries the supporting structure 14 and allows its turning movement vertically around the securing device 12. The adjusting and bearing element 30 serves simultaneously the adjustment and bearing-location of the supporting structure 14. It has a variable arrangement set-up in its height.

The supporting structure 14 furthermore indicates an adjusting device 26 by means of which solar modules and/or solar collectors 16 are adjustable. By way of the adjusting device 26, an adaptation of an inclination angle 34 of the solar modules and/or solar collectors 16 can be carried out manually or automatically by means of an adjustment performed by an actuating device. Where an automatic adjustment is concerned, it is ensured that a sun incident angle of 90° is set at all times onto the solar modules and/or the solar collectors 16. With a manual execution of the adjusting device 26, a seasonal setting of the most advantageous inclination angle of the solar modules and/or the solar collectors 16 is effected according to the time (season) of the year.

The solar unit $10_{26}$ also indicates a transmission device 32 which is essentially at a right angle to the supporting structure 14. FIG. 1 shows the transmission device 32, consisting of a supporting frame 22 which comprises brackets 18 and guide elements 20 belonging to each bracket, and a connecting element 24. The supporting frame 22 has, in particular, four brackets 18A, 18B, 18C and 18D which can be executed offset in particular at 90°. The described arrangement of four brackets merely represents a preferred embodiment. In this respect, embodiments with supporting frames 22 are conceivable which have no brackets 18A–D. In this way, for example, all conceivable elements by means of which connecting elements 24 are supportable, can be secured as a substitution for the supporting frame 22 directly to the supporting structure 14.

Each bracket 18A, 18B, 18C and 18D has the guide element 20 where the guide element 20 has guide grooves 36 for guiding the connecting element 24. The guide grooves 36 are not illustrated in FIG. 1 for reasons of clarity. Illustration and description is in FIG. 7. The connecting element 24 is, in particular, a cable whereas two solar units $10_{26}$, $10_{27}$ are executed preferentially with two cables 24A and 24B for reasons involving equal force effect on the supporting structure 14.

In this case, further embodiments of connecting elements 24 are conceivable. Moreover, an execution by means of belts, by means of chains or by means of link-type rods can be carried out.

Each connecting element 24—as already mentioned—is secured to a pre-determined guide element 20 of the brackets 18A or 18B or 18C or 18D. A bracket 18 is shown in FIG. 7. FIG. 7 shows the guide grooves 36 of the connecting element 24 which are arranged in the guide elements 20. Each connecting element 24 has a stop point on the solar unit $10_{26}$ and the solar unit $10_{27}$, on the guide element 20 belonging to the brackets 18A or 18B or 18C or 18D of the individual solar unit.

An actuating device 38 not shown in greater detail in FIG. 1 allows a two-side turning around a vertical axis of the supporting structure 14 of up to 360°. Furthermore, a manual actuating movement of the supporting structure 14 can also be carried out.

As an actuating device 38, a motor in particular can be arranged. Its illustration in FIG. 1 has been relinquished as it is not relevant to the invention.

FIG. 2 shows the transmission device 32 of the two solar units $10_{26}$ and $10_{27}$. In this case, a possible basic starting position is shown in FIG. 2 where the solar units $10_{26}$ and $10_{27}$ and the installed solar modules are, for example, aligned in the southerly direction. FIG. 2 shows the arrangement of the brackets 18A, 18B, 18C and 18D of the solar units $10_{26}$ and $10_{27}$ as well as the connecting element 24A and the connecting element 24B, in particular in a cable execution.

It is evident that the connecting element 24A is bound to the guide elements 20 of the bracket 18C of the solar unit $10_{26}$ and $10_{27}$.

Analogously to the statements on the connecting element 24A, FIG. 2 shows the connecting element 24B which is not only bound to the solar unit $10_{26}$ at the guide element 20 of the bracket 18A but also to the solar unit $10_{27}$ at the guide element 20 of the bracket 18A.

FIG. 2 also shows, by way of completion, the securing device 12 and the swivel-mounted supporting structure 14, of which the brackets 18A–D, leading away for both solar units $10_{26}$ and $10_{27}$, are illustrated.

FIG. 3 also shows the solar units $10_{26}$ and $10_{27}$ which are coupled to one another by means of the connecting elements 24A and 24B. In FIG. 3, however, the transmission devices 32 are moved in the turning direction 40 (easterly direction).

In contrast with FIG. 2, the function mode is clear from FIG. 3. The individual brackets 18A, 18B, 18C and 18D of the solar unit $10_{26}$ are moved by 90° in the turning direction 40. Analogous to this, the brackets of the solar unit $10_{27}$ of the transmission device 32 are moved correspondingly. All interim positions are possible.

For reasons of completion and example, FIG. 3 shows in the solar unit $10_{27}$ a supporting frame 22 which consists of a bracket 18A with the relevant guide element 20. The securing device 12 and the supporting structure 14 supplement FIG. 3.

FIG. 4 shows, corresponding to FIG. 3, an actuating movement in the turning direction 40 (westerly direction) of the solar units $10_{26}$ and $10_{27}$ based on the transmission device 32. From FIG. 4 it is clear that, analogue to FIG. 3, the connecting element 24A of the solar unit $10_{26}$ is moved by 90°. Analogue to the solar unit $10_{26}$ the 90'-turn of the solar unit $10_{27}$ is effected in the turning direction 40 (westerly direction) and the movement of the connecting element 24B.

The turning direction 40 to the west as shown in FIG. 4 corresponds to FIG. 1.

The connecting elements 24A and 24B are secured by the guide of the guiding elements 20 of the brackets 18A, 18B, 18C and 18D. For purposes of completion, the securing device 12 and the supporting structure 14 are shown. The bracket 18B with the guide element 20 forms, in an exemplary manner, a supporting frame 22.

FIG. 5 also shows in a plan view a vertical extension proceeding from the basic position of the solar units $10_{26}$ and $10_{27}$ as described in FIG. 2. The illustration is again based on the transmission device 32. A further solar unit $10_{16}$ in vertical direction is added to the solar unit $10_{26}$. In this way and manner, an extension and/or a reduction of solar units of the solar plant is possible.

It is clearly evident that, in accordance with the previous explanatory statements, the solar units $10_{26}$ and $10_{16}$ are connected by means of the connecting elements 24C and 24D.

FIG. 5 shows clearly that, between the brackets 18A and 18B and the relevant guiding elements 20 of the solar unit $10_{26}$, already four partial areas of the connecting elements 24A, 24B, 24C and 24D are located in the guide grooves 36 of the individual guiding elements 20.

In FIG. 5, the solar unit $10_{26}$ has two more degrees of freedom. With the assumption of two further solar units arranged at the freedom degrees, and with due consideration of the similar arrangement of two connecting elements 24 for each solar unit $10_{xx}$, it is imperative according to further persistent consideration that, between the brackets 18A/18B and 18B(18C as well as 18C/18D and 18A/18D of the solar unit $10_{26}$, four partial areas, in each case, of the connecting elements are carried by the guiding elements 20 belonging to the brackets 18A–D.

The location of the connecting elements 24 is effected in the guide grooves 36 of the guiding elements.

The partial areas between the brackets 18A/18B and 18B/18C as well as 18C/18D and 18A/18D are formed by eight connecting elements 24 with an arrangement of five solar units, where the solar unit $10_{26}$ in FIG. 5 is centrally arranged.

FIG. 6 shows a schematic illustration of a possible assembly set-up form of a solar plant, consisting of a number of solar units $10_{xx}$. In this case and for reasons of clarity, the securing device 12 with the relevant supporting structure 14 and the brackets 18 are shown schematically. Also shown is the coupling of an actuating device 38 to a preferred solar unit $10_{16}$. All other arrangements of the solar units $10_{xx}$ and of the actuating device 38 are conceivable.

The assembly set-up form of the solar plant in FIG. 6 consists of thirty six solar units, where a substantial advantage of this assembly configuration lies in the fact that, proceeding from actuating device 38 in all directions, a maximum of five transmission steps is necessary. This assembly configuration is particularly advantageous for a uniform force distribution within a solar plant.

Two examples underline the clarity of this statement. In this way, the solar units $10_{16}$ and $10_{46}$ are coupled together by way of five transmission steps via the solar units $10_{26}$, $10_{34}$, $10_{40}$ and $10_{44}$.

As a second example, a coupling between solar unit $10_{16}$ and solar unit $10_{42}$ via the solar units $10_{26}$, $10_{34}$, $10_{40}$ and $10_{41}$ is realised with five transmission steps.

FIG. 7 shows the already mentioned guide element 20 which is secured to the brackets 18. The guide element 20 indicates the guide grooves 36.

From the description of FIG. 5, it can be derived that a star-shaped arrangement and coupling of five solar units by means of eight connecting elements 24 is achieved. With this, eight guide grooves 36 are necessary for locating eight connecting elements 24.

The execution of the guide grooves 36 ensures simultaneously the centering of the connecting elements 24. FIG. 7 shows in an exemplary manner two executed connecting elements 24 in the guide grooves 36.

FIG. 8 shows a possible construction form of the already mentioned adjusting and bearing element 30 which is arranged as a replaceable element in the head of the securing device 12. By means of the variable layout, particularly the construction height of the adjusting and bearing element 30, it is possible to adjust the supporting structure 14 shown in FIG. 8 in its height. The measure of replaceability of the adjusting and bearing elements 30 primarily serves the purpose of compensation of tolerances from the assembly of the securing devices 12 and the supporting structures 14.

A friction-free transmission of turning movements and, subsequently, realised and simultaneous follow-up between the solar units $10_{xx}$ is established in particular under the assumption of an exact, practically tolerance-free alignment of all solar units $10_{xx}$.

The possible friction-free transmission is realised by a bush 44 in the embodiment example. The bush 44 is executed in a U-form in order to ensure the adjustment at the same time, and lateral guides occur. The bush is executed in particular from a low-friction synthetic material. Other solutions and materials are conceivable.

FIG. 9 shows a possible height adaptation of the solar plant on inclined and uneven ground surface. The adaptation is achieved by means of different lengths of the securing devices 12 or by means of deflection rollers 42.

The first possibility of height adaptation by means of height adaptation of the securing devices 12 is illustrated in FIG. 9 between the solar units $10_{26}$, $10_{34}$ and $10_{40}$.

The second possibility of height adaptation with at least one deflection roller 42 for deflecting the connecting elements 24 is shown with the use of two deflection rollers 42 between the solar units $10_{40}$ and $10_{44}$.

In the embodiment example and with regard to the stated turning direction 40, no explicit description of the northerly direction is contained. By means of complete turning capability of the solar units $10_{xx}$ around their vertical axis, an installation on the northern hemisphere and on the southern hemisphere is possible.

REFERENCE PART LIST $10_{xx}$ Solar unit
12 Securing device
14 Supporting structure
16 Solar collector/solar modules
18A–D Brackets
20 Guide elements
22 Supporting frame
24A–D Connecting element
26 Adjusting facility
28 Journal bearing
30 Adjusting and bearing element
32 Transmission device
34 Angle of inclination
36 Guide grooves
38 Actuating device
40 Direction of turning
42 Deflection roller
44 Bush

What is claimed is:
1. Solar plant with at least two solar units wherein each of the solar units comprises a securing device and a supporting structure rotatably mounted thereon, on which solar modules and/or solar collectors are mountable and which are capable of following the course of the sun by means of its rotational axis essentially vertical to the earth's surface, wherein the supporting structure of at least one of the solar units is connected to at least one mechanical transmission device, said transmission device comprising a supporting frame with at least one bracket and at least one guide element for guiding at least one connecting element, said guide element being located at the end of at least one bracket and being provided with guide grooves for guide-location of the at least one connecting element, said supporting structure being connected to at least one additional supporting structure of the solar unit for the transmission of an actuating movement.

2. Solar plant according to claim 1, wherein the supporting structure is rotatably mounted on the securing device by means of a journal bearing and an adjusting and bearing element, guided by a bush.

3. Solar plant according to claim 1, wherein the supporting structure has an adjusting facility for the solar modules and/or the solar collectors.

4. Solar plant according to claim 1, wherein the adjusting facility enables an adaptation of the angle of inclination of the solar modules and/or the solar collectors by way of manual adjustment or by means of an adjustment made with an actuating device, so that an angle of incidence of the sun of 90° onto the solar modules and/or the solar collectors is adjustable.

5. Solar plant according to claim 1, wherein the transmission device is arranged essentially at a right angle to the supporting structure.

6. Solar plant according to claim 1, wherein the supporting frame has four brackets, each of which is offset by 90°.

7. Solar plant according to claim 1, wherein the connecting element is a cable.

8. Solar plant according to claim 1, wherein the connecting element is a belt.

9. Solar plant according to claim 1, wherein the connecting element is a chain.

10. Solar plant according to claim 1, wherein the connecting element is a link-type rod.

11. Solar plant according to claim 1, wherein the connecting element can be bound on both sides to the individual guiding elements of the brackets.

12. Solar plant according to claim 1, wherein each solar unit is connectable with two connecting elements.

13. Solar plant according to claim 1, wherein the actuation movement can be carried out manually and/or by means of an actuating device and each position of the sun is adjustable by means of a two-sided rotation of the supporting structures.

14. Solar plant according to claim 1, wherein the actuating device is an electro-motor.

15. Solar plant according to claim 1, wherein a height adaptation is attainable by either a change of the length of the securing devices or by means of at least one deflection roller.

* * * * *